United States Patent [19]

Io

[11] Patent Number: 4,870,864
[45] Date of Patent: Oct. 3, 1989

[54] ACCELEROMETER

[75] Inventor: Shinichi Io, Kanagawa, Japan

[73] Assignee: Atsugi Motor Parts Company Limited, Kanagawa, Japan

[21] Appl. No.: 63,263

[22] Filed: Jun. 17, 1987

[30] Foreign Application Priority Data

Jun. 20, 1986 [JP] Japan .................................. 61-144472

[51] Int. Cl.$^4$ .......................... G01P 15/08; G01P 15/11
[52] U.S. Cl. ............................... 73/517 R; 73/DIG. 1
[58] Field of Search .......... 73/517 R, 516 R, DIG. 3; 340/669, 52 H

[56] References Cited

U.S. PATENT DOCUMENTS

| | | | |
|---|---|---|---|
| 2,987,669 | 3/1961 | Kallmann | 73/DIG. 3 |
| 3,431,417 | 11/1969 | Chope | 73/517 R |
| 3,557,628 | 4/1971 | Tsukada | 73/516 R |
| 3,961,185 | 6/1976 | Brokenshire et al. | 250/231 R |
| 4,498,341 | 2/1985 | Breitbach et al. | 73/517 R |

FOREIGN PATENT DOCUMENTS

| | | |
|---|---|---|
| 1816998 | 10/1970 | Fed. Rep. of Germany . |
| 2709156 | 6/1978 | Fed. Rep. of Germany . |
| 2366683 | 5/1978 | France . |

Primary Examiner—Stewart J. Levy
Assistant Examiner—Robert P. Bell
Attorney, Agent, or Firm—Bachman & LaPointe

[57] ABSTRACT

First and second Hall-effect proximity sensors are arranged in combination with a magnet so that when the magnet is moved under the influence of an accelerative force or the like the output of one sensor increases while the other decreases. The magnitude of the difference between the two outputs is indicative of the force while the effects of temperature on the individual signals mutually offset one and other.

9 Claims, 3 Drawing Sheets

ACCELEROMETER

BACKGROUND OF THE INVENTION

1. Field of the Invention

The present invention relates to an accelerometer and more specifically to an accelerometer for use in an automotive vehicle or the like and which exhibits an arrangement whereby temperature compensation can be effected without the need of a temperature sensor and associated complex circuitry.

2. Description of the Prior Art

In order to control modern suspensions and the like type of automotive apparatus in a manner which ensures safe stable operation it is necessary to sense the level of acceleration that the vehicle is being subject to in vertical (up and down) and lateral (left and right) directions as well as the direction (fore-aft)in which the vehicle is travelling. To accomplish this it is known to use one or more accelerometers of the type disclosed in Japanese Provisional Pat. Publication No. 52-49871. The device disclosed in this document includes a permanent magnet which is suspended in a manner that it can be displaced in one of the above mentioned vertical, lateral or for- aft directions of the vehicle; and a Hall-effect Hall IC which disposed proximate the magnet in a manner to be responsive to the movement thereof.

However, the arrangement while being simple has suffered from the drawback that the Hall IC is suseptible to temperature variation in a manner that the level of output thereof varies unacceptably. In order to compensate for this it has been proposed to include a temperature sensor arrangement in the IC which corrects the output level. However this not only complicates the circuitry but increases the size, weight and cost of the device.

SUMMARY OF THE INVENTION

It is an object of the present invention to provide an acceleration sensor arrangement which is arranged to exhibit temperature compensation without the need to resort to the provision of a temperature sensor and associated complex circuitry.

In order to achieve the above object first and second Hall-effect or the like type proximity sensors are arranged in combination with a magnet so that when the magnet is moved under the influence of an accelerative force or the like the output of one sensor increases while the other decreases. The magnitude of the difference between the two outputs is indicative of the force while the effects of temperature on the individual signals mutually offset one and other providing temperature compensation.

More specifically, the present invention takes the form of an accelerometer which features a first proximity sensor disposed in a casing; a second proximity sensor disposed in a casing close to the first one; a magnet movably supported within the casing by a flexible member so as be movable from a neutral position in a first and second opposite directions, the first and second proximity sensors being arranged so that when the magnet is moved in the first direction the output of the first sensor increases and the second sensor decreases and when the magnet moves in the second direction the output of the second sensor increases and the output of the first one decreases.

DETAILED DESCRIPTION OF THE PREFERRED EMBODIMENT

Figure 1:
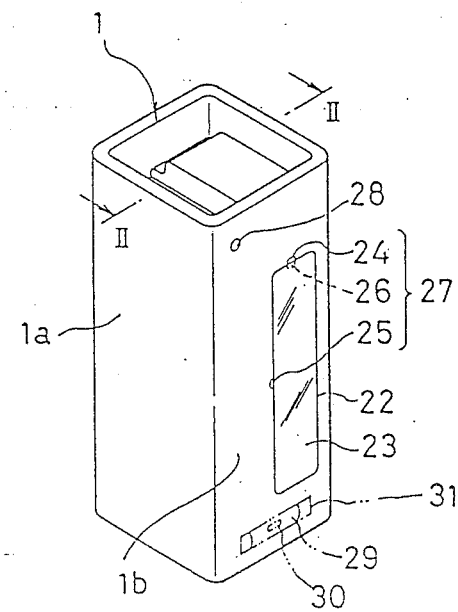
FIG. 1 is a perspective view of an accelerometer according to the present invention.
Figure 2:
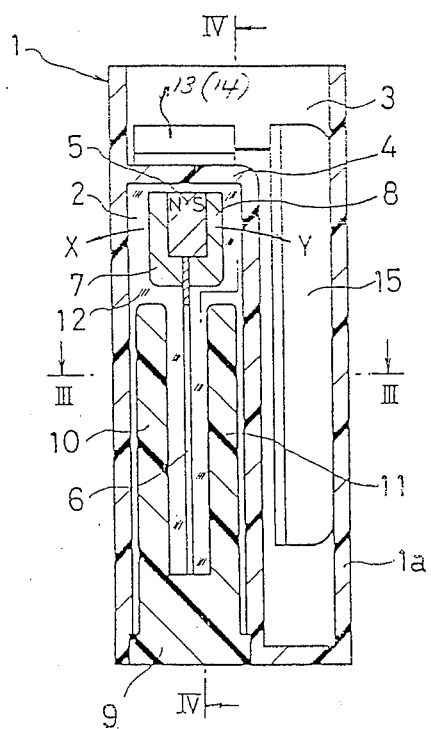
FIG. 2 is a sectional front elevation taken along section line II—II of FIG. 1.
Figure 3:
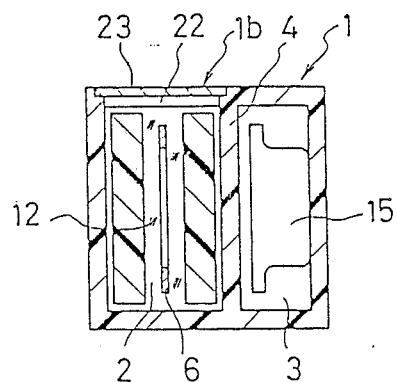
FIG. 3 is a sectional plan as taken along section line III—III of FIG. 2.

FIGS. 1 to 7 show an embodiment of the present invention. In this arrangement the interior of an elongate rectangular section non-magnetic casing 1 is partitioned into first and second sections 2, 3 by a partition wall. A permanent magnet 5 is disposed in the first of the two sections and supported on a flexible non-magnetic support member 6 which in this instance is made of a phosphor bronze of the like material. The member 6 in this embodiment takes the form of an essentially rectangular thin plate in which a large oval cut-out 6a is formed (see FIG. 4). The plate is arranged to be flexible in one direction (viz., in first and second opposite directions x and y—as shown schematically in FIG. 5). The poles (N,S) of the magnet 5 are aligned with the direction in which the member 6 is flexible. Weights 7 and 8 are attached to each face of the magnet 6 in a manner as shown in FIG. 2. The weights are formed of a non-magnetic material and are selected so that the combined mass of the weights and the magnet is of a value predetermined in view of the intended application of the device.

To facilitate easy production and assembly of the device the lower end (viz., the end distal from the magnet 5) of the flexible member 6 is embedded in a non-magnetic support 9 which can be sealingly inserted through an aperture formed in the lower end face of the casing 1 and project into the first section 2 of the casing 1. In this embodiment the support 9 is formed with two rectangular cross-section finger-like extensions 10, 11 which flank the front and rear face of the support member 6. The first section 2 contains a damper oil 12. This fluid exhibits suitable viscosity and other physical properties suitable for damping excessively rapid motion of the pendulum like arrangement defined by the magnet 6, weights 7, 8, and flexible support member 6 and thus ensures stable operation of the device.

Figure 4:
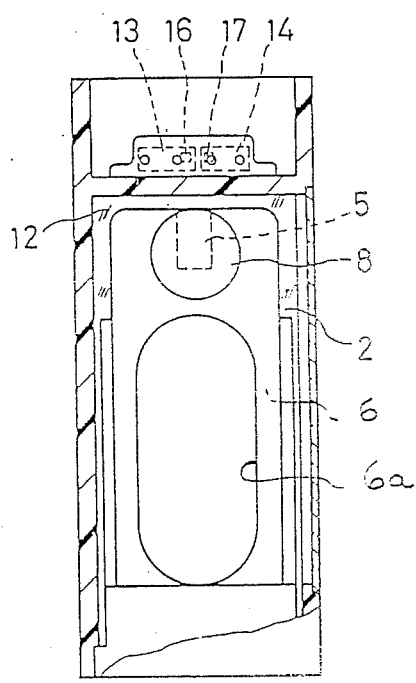
FIG. 4 is a sectional side elevation taken along section line IV—IV of FIG. 2.

First and second proximity sensors 13, 14 which in this embodiment take the form of linear type Hall-effect IC units are are disposed on the partition wall 4 in the second section 3 in a manner such as shown in FIGS. 2 and 4. Each of these units has a respective Hall-effect element 16, 17 which are arranged in close proximity of the magnet in an essentially side-by-side manner. In accordance with the present invention the elements 16 and 17 are arranged in a manner that when the magnet moves in the x direction for example the output of one element increases while the other decreases and vice versa.

A differential amplifier circuit 15 is attached to an inner wall of the casing 1 in a manner to be spaced from the partition wall 4. This circuit provides an operative interconnection between the proximity sensors and a control circuit not shown such as that used to control an anti-skid control system, suspension or the like.

Figure 5:
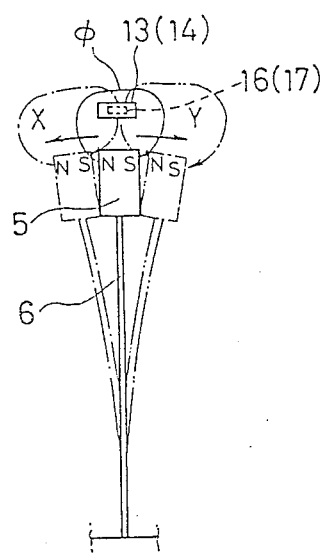
FIG. 5 is a schematic elevation showing the fundamental arrangement of the present invention.
Figure 6:
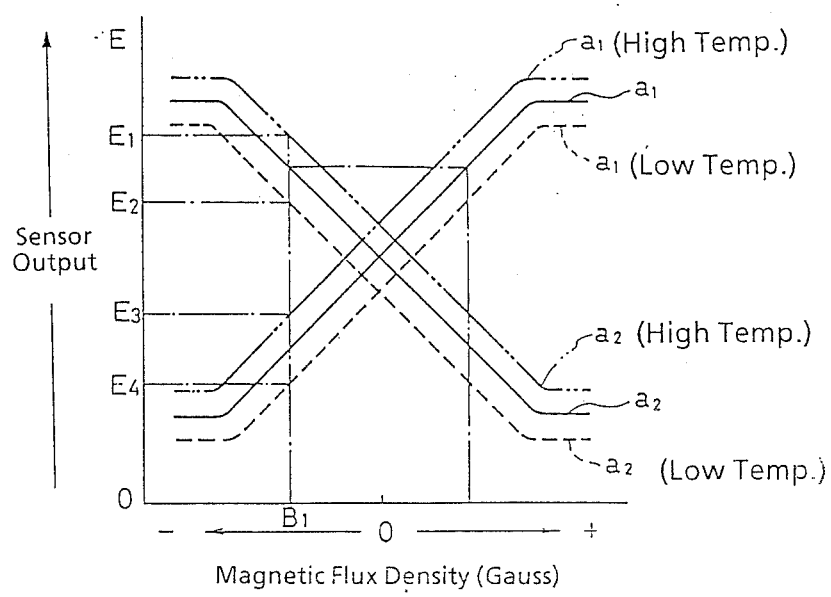
FIG. 6 is a graph in terms of (a) the output of the Hall-effect sensor arrangement utilized in the present invention and (b) the displacement of the permanent magnet from a neutral or home position assumed when not subject to acceleration, the mutual cancellation effect which characterizes the present invention.

FIG. 6 shows in graphical form the output characteristics of the two proximity sensors 13, 14 and the effect of temperature thereon. With the present invention the sensors 13, 14 are arranged so that when the magnet 5 assumes a neutral position the outputs of the two sensors are equal. In FIG. 6 this situation is shown by the intersection of the traces a1 (sensor 13) and a2 (sensor 14) at a magnetic flux density denoted by "0". However, when the magnet 5 is moved under the influence of accelerative forces the output of one increases while the output of the other decreases. Upon the magnet 5 being displaced by more than a predetermined amount the output of the sensors tends to become constant. Accordingly, the instant device is constructed so that the maximum possible displacement of the magnet is limited in a manner, which as shown in FIG. 5, is such that the effective magnetic field (phi) generated by magnet 5 does not move to the point that the output of either sensor becomes constant. This ensures accurate metering even when the flexible member 6 is subject to maximum deflection.

As will be appreciated with the present invention, when the magnet 5 is displaced, the difference between the two outputs for any change in magnetic field intensity is constant irrespective of the drift in output caused by changes in temperature while the magnitude of the difference indicative of the acceleration to which the mass (magnet and weights) are subject. For example, under relatively high temperature conditions for a deflection which changes the magnetic field to point B1, the outputs of sensors 13 and 14 are E1 and E3 respectively, while under relatively low temperature conditions the corresponding outputs are E2 and E4. As will be noted the magnitude of E1–E3 and the magnitude of E2–E4 are the same.

Figure 7:
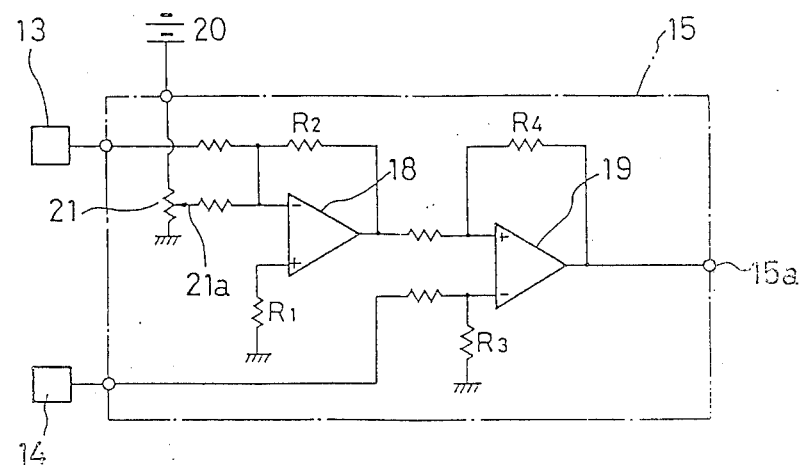
FIG. 7 is a circuit diagram showing a circuit arrangement utilized in the disclosed embodiment of the instant invention.

FIG. 7 shows an example of a circuit arrangement which can be used to detect the difference between the outputs of the two Hall-effect units 13, 14 and generate a signal indicative of the acceleration to which the magnet 5 is subject. This circuit includes two differential amplifiers 18, 19. The first of these units is operatively connected with the Hall-effect IC 13 and a source of power 20. A variable resistor 21 is arranged between the current source 20 and connected with the inverting input (−) of differential amplifier 18 through a pickup 21a. The non-inverting input (+) of this device is connected to ground through a first pulldown resistor R1. The output of differential amplifier 18 is connected to its own inverting input (−) via resistor R2 and to the non-inverting input (+) of the second amplifier 19. The inverting input (−) of the second amplifier 19 is connected to the second sensor 14 and to ground through a pulldown resistor R3. The output of the second amplifier 19 is connected to its own non-inverting input (+) via resistor R4.

A lamp 28 is disposed in an upper corner of the 1b face of the casing 1. This lamp 28 is operatively connected with the differential amplifier circuit 15 in a manner that it becomes illuminated when a balance between the outputs of the two proximity sensors 13, 14 is achieved. This of course facilitates adjustment of variable resistor 21 in that it is possible to visually detect the situation wherein a balance has been achieved between the outputs of the two proximity sensors and a zero output appears on terminal 15a.

As the first section 2 of the casing 1 contains damper oil 12 it is necessary to allow for its thermal expansion by providing an air space of controlled volume therein (an air bubble). For this purpose the casing 1 of the instant embodiment is formed with an inspection window 22 in side denoted by 1b in FIG. 1. This window is closed by a transparent or semi-transparent panel 23. Two level markers 24 and 25 are formed at the periphery of the window 22. By using these markers it is possible to determine by visual inspection if the appropriate amount of air is present. Further, as will be noted, the air bubble 26 and the marker 24 act as a "spirit level" or level gauge which is used for setting the accelerometer in place when it is to be used for lateral and forward directional sensing while the marker 25 and the bubble are used when the device is to be disposed horizontally for sensing vertical acceleration.

Alternatively, it is possible to provide a separate level gauge arrangement such as denoted by the numerals 29–31 in FIG. 1 if so desired.

It will be noted that although disclosure has been made with reference to Hall-effect type sensors it will be appreciated that other types of sensors such as magnetic resistance effect types can be used without departing from the scope of the present invention.

What is claimed is:

1. In an accelerometer
   a first proximity sensor disposed in a casing;
   a second proximity sensor disposed in a casing close to said first proximity sensor and;
   a magnet movably supported within the casing on a flexible member so as to be movable from a neutral position in a first and second opposite directions, said first and second proximity sensors being arranged so that when said magnet is moved in said first direction the output of the first sensor increases and the second sensor decreases and when the magnet moves in the second direction the output of said second sensor increases and the output of the first one decreases, wherein said casing includes a wall portion which hermetically divides the interior of the casing into first and second sections, wherein said magnet and the flexible member on which the magnet is supported being disposed in the first section and wherein the first and second proximity sensors are disposed in said second section.

2. An accelerometer as claimed in claim 1, wherein said first section contains a damping fluid which exerts a damping effect on the movement of said magnet.

3. An accelerometer as set forth in claim 1 wherein an illumination device is provided for becoming illuminated when the respective signal outputs of a pair of hall effect transducers forming said first and second proximity sensors become equal.

4. An accelerometer as set forth in claim 3 wherein attenuation means is provided for attenuating the output of one of said pair of hall effect transducers so as to make the respective outputs of said pair of hall effect transducers mutually equal.

5. An accelerometer as set forth in claim 1 wherein said magnet is disposed within said first section a liquid damping fluid is provided about said magnet and a bubble is provided in said liquid damping fluid for allowing for temperature dependent fluctuation in the volume of said liquid damping fluid.

6. An accelerometer as set forth in claim 5 wherein a light conducting portion is formed at a portion of said first section through which light conducting portion the position and size of said bubble may be discerned for determining the orientation of said first section and the level of said damping fluid.

7. An accelerometer as set forth in claim 5 wherein said flexible member is provided on a sealing member separate from said first section, said sealing member being received in an aperture in said chamber for forming a liquid seal.

8. In an accelerometer
a first proximity sensor disposed in a casing;
a second proximity sensor disposed in a casing close to said first proximity sensor;
a magnet movably supported within the casing on a flexible member so as to be movable from a neutral position in a first and second opposite directions, said first and second proximity sensors being arranged so that when said magnet is moved in said first direction the output of the first sensor increases and the second sensor decreases and when the magnet moves in the second direction the output of said second sensor increases and the output of the first one decreases, wherein said casing includes a wall portion which hermetically divides the interior of the casing into first and second sections, wherein said magnet and the flexible member on which the magnet is supported being disposed in the first section and wherein the first and second proximity sensors are disposed in said second section, said first section containing a damping fluid which exerts a damping effect on the movement of said magnet, wherein said first section includes a predetermined small quantity of air and which further comprises means defining a transparent window in the casing, said window opening into said first section and including a marker which can be used in combination with the small quantity of air as a level gauge.

9. In an accelerometer
a first proximity sensor disposed in a casing;
a second proximity sensor disposed in a casing close to said first proximity sensor;
a magnet movably supported within the casing on a flexible member so as to be movable from a neutral position in a first and second opposite directions, said first and second proximity sensors being arranged so that when said magnet is moved in said first direction the output of the first sensor increases and the second sensor decreases and when the magnet moves in the second direction the output of said second sensor increases and the output of the first one decreases, wherein said casing includes a wall portion which hermetically divides the interior of the casing into first and second sections, wherein said magnet and the flexible member on which the magnet is supported being disposed in the first section and wherein the first and second proximity sensors are disposed in said second section, said first section containing a damping fluid which exerts a damping effect on the movement of said magnet, wherein said first section includes a predetermined small quantity of air and which further comprises means defining a transparent window in the casing, said window opening into said first section and including a marker which can be used in combination with the small quantity of air as a level gauge and wherein said flexible member is mounted on a member separate from said casing, said separate member being disposed in an aperture formed in said casing.

* * * * *